(12) United States Patent
Haynes

(10) Patent No.: US 7,553,385 B2
(45) Date of Patent: Jun. 30, 2009

(54) COLD GAS DYNAMIC SPRAYING OF HIGH STRENGTH COPPER

(75) Inventor: Jeffrey D. Haynes, Stuart, FL (US)

(73) Assignee: United Technologies Corporation, Hartford, CT (US)

( * ) Notice: Subject to any disclaimer, the term of this patent is extended or adjusted under 35 U.S.C. 154(b) by 529 days.

(21) Appl. No.: 10/995,876

(22) Filed: Nov. 23, 2004

(65) Prior Publication Data

US 2006/0108031 A1 May 25, 2006

(51) Int. Cl.
*C22F 1/08* (2006.01)
(52) U.S. Cl. .......................... 148/687; 416/8; 427/446; 427/455; 427/456
(58) Field of Classification Search ................. 148/687; 419/8; 427/446, 455, 456
See application file for complete search history.

(56) References Cited

U.S. PATENT DOCUMENTS

| 4,063,940 | A | * | 12/1977 | Dain et al. ................ 419/30 |
| 5,042,565 | A | | 8/1991 | Yeun et al. |
| 6,134,785 | A | | 10/2000 | Walter et al. |
| 6,846,575 | B2 | | 1/2005 | Hasz et al. |
| 7,070,835 | B2 | * | 7/2006 | Burns ..................... 427/446 |
| 2002/0073982 | A1 | | 6/2002 | Shaikh et al. |

FOREIGN PATENT DOCUMENTS

| GB | 2394479 | | 4/2004 |
| JP | 4-116107 | A | 4/1992 |
| JP | 10-54302 | A | 2/1998 |
| JP | 2001-311593 | A | 11/2001 |
| JP | 2003342691 | * | 12/2003 |
| JP | 2004-137602 | A | 5/2004 |

OTHER PUBLICATIONS

M. Koizumi, M. Nishihara: "Isostatic pressing: Technology and application" 1991, Elsevier Science Publishers Ltd., Britain, XP002380278, p. 67-68.
David L. Ellis: "Conductivity of GRCop-42 alloy enhanced" Internet Article, Aug. 16, 2004, pp. 1-2, XP002380255, the whole document.
M.W. Decker et al., Creep Properties of an Extruded Copper-8% Chromium-4% Niobium Alloy, Materials Science and Engineering, 2004, pp. 101-111.

* cited by examiner

*Primary Examiner*—Sikyin Ip
(74) *Attorney, Agent, or Firm*—Bachman & LaPointe, P.C.

(57) ABSTRACT

A process for forming an article, such as a combustion chamber liner, comprises the steps of providing a mandrel formed from a material, such as an aluminum containing material, having a net shape of the article to be made, depositing a powdered metal material onto the mandrel without melting the powdered metal material, and removing the material forming the mandrel to leave a free standing monolithic article. In a preferred embodiment of the present invention, the powdered metal material comprises powdered GRCop-84. Alternatively, the powdered metal material may be GRCop-42.

25 Claims, 3 Drawing Sheets

COLD GAS DYNAMIC SPRAYING OF HIGH STRENGTH COPPER

BACKGROUND OF THE INVENTION (1) Field of the Invention

The present invention relates to a process and a system for forming an article, such as a combustion chamber liner, using a cold spray technique.

(2) Prior Art

Rocket propulsion development programs have been focusing on the use of high strength copper alloys for improved heat transfer in combustion chamber liners. Historically, the space shuttle main engine has used a precipitation strengthened alloy called Narloy-Z. Recently, NASA has developed new alloys designated GRCop-84 which consists of 8.0% Cr, 4.0% Nb, and the balance copper and inevitable impurities and GrCop-42 which consists of 4.0% Cr, 2.0% Nb, and the balance copper and inevitable impurities. These alloys use a chrome-niobium strengthening precipitate, are more thermally stable, and provide better creep and fatigue life at operating conditions. GRCop-84 has been processed in the wrought state and has been applied using vacuum plasma spray to net shapes. One of the limitations of these new alloys is the lengthy and complex manufacturing process to fabricate combustion chamber liners through extrusion, rolling, friction stir welding, spinning and/or vacuum plasma spray.

Thus, there remains a need for a simple, streamlined technique for forming articles, such as a combustion chamber liner, using alloys, such as GRCop-84, white retaining inherent powder characteristics.

SUMMARY OF THE INVENTION

Accordingly, it is an object of the present invention to provide an improved process for forming an article having retained powder characteristics such as $Cr_2Nb$ size retention and/or thermal conductivity.

It is a further object of the present invention to provide an improved system for forming an article having retained powder characteristics such as $Cr_2Nb$ size retention and/or thermal conductivity.

It is still a further object of the process and system of the present invention for forming a combustion chamber liner with good thermal conductivity properties.

The foregoing objects are attained by the process and the system of the present invention.

In accordance with a first aspect of the present invention, a process for forming an article broadly comprises the steps of providing a mandrel formed from a material having a net shape of the article to be made, depositing a powdered metal material onto the mandrel without melting the powdered metal material, and removing the material forming the mandrel to leave a free standing monolithic article. The process of the present invention has particular utility in forming a combustion chamber liner.

In accordance with a second aspect of the present invention, a system for forming an article, such as a combustion chamber liner, broadly includes a mandrel formed from a material having a net shape of the article to be made, means for depositing a powdered metal material onto the mandrel without melting the powdered metal material, and means for removing the material forming the mandrel to leave a free standing monolithic article.

Other details of the cold gas dynamic spraying of high strength copper, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Recently, there has been developed a new metal spray deposition process that is called "cold gas dynamic spraying" or "cold spray". This process is unique from other spray processes in that the powdered metal material to be deposited is not melted during spray deposition. Rather inert gas is used to accelerate fine metal powder particles to very high velocities, typically greater than 800 m/s. Using this process, a deposit will be formed through plastic deformation and mechanical bonding. The beneficial characteristics of this process include the same or lower oxygen content of the deposited coating in comparison to the starting powder, compressive residual stresses, and retained powder microstructure.

The process may be used to deposit an alloy onto a mandrel having a net shape of the article to be formed. For example, if one wanted to form a combustion chamber liner, the alloy may be sprayed onto a mandrel, preferably formed from an aluminum containing material, of net combustion chamber liner shape. Suitable alloys that may be deposited include copper alloys, such as GRCop-84 and GRCop-42, as well as aluminum alloys. The alloy to be deposited may be sprayed onto the mandrel using the apparatus shown in the FIGS. 1A and 1B.

Figure 1A:
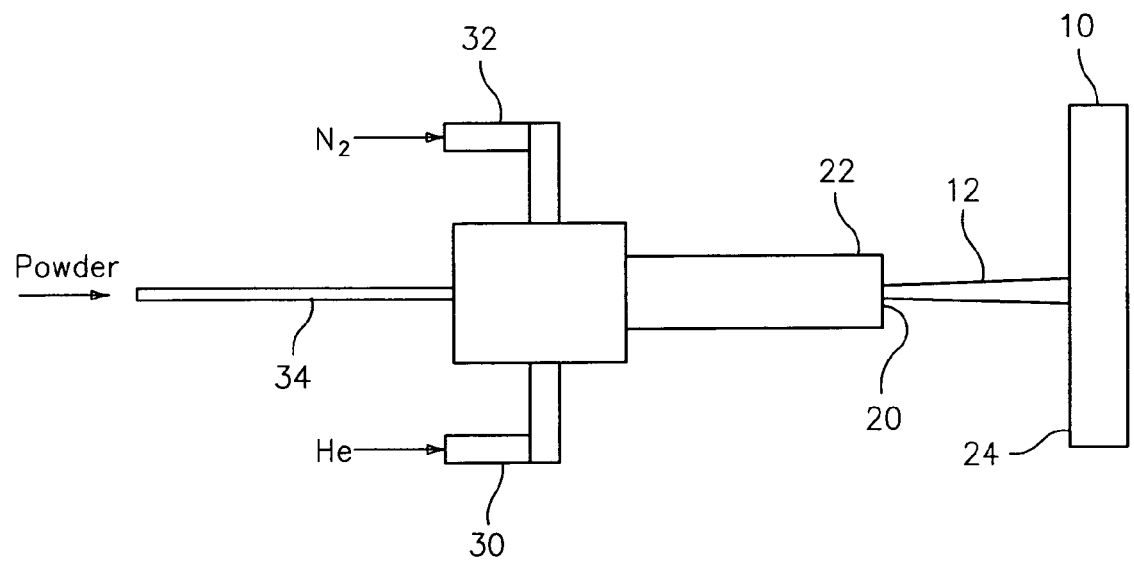
FIGS. 1A and 1B illustrate a system for forming an article, such as a combustion chamber liner.
Figure 1B:
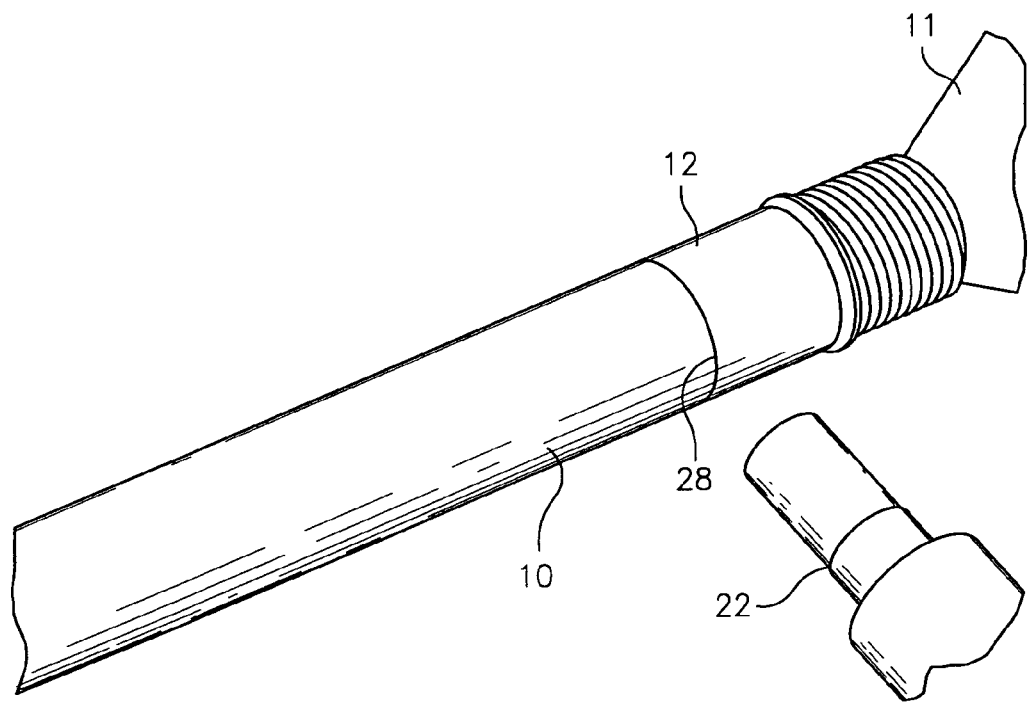

Referring to FIGS. 1A and 1B, in accordance with the present invention, a process is provided for forming a deposit or coating of a copper base alloy 12 on outer and/or inner surfaces of a mandrel 10, such as a mandrel preferably formed from an aluminum containing material. The mandrel 10 may have the shape of the article to be fabricated such as a net combustion chamber liner shape. If desired, the mandrel 10 may be turned during deposition using any suitable turning means 11 known in the art.

In the process of the present invention, the feedstock may be a powdered metal such as fine particles of a powdered copper alloy material. The fine particles are preferably accelerated to supersonic velocities using compressed gas, for example, helium, nitrogen, or some other inert gas. Helium is a preferred gas due to its low molecular weight and because it produces the highest velocity at the highest gas cost. The powdered metal particles that are used to form the deposit preferably have a diameter in the range of 5 microns to 50 microns. Typical thermal spray powders are usually too large for cold spray. Smaller particles sizes such as those mentioned above enable the achievement of higher particle velocities and generate manageable energies so impact does not unduly distort previously deposited materials. Below 5 microns in diameter, the particles of the powder get swept away from the mandrel 10 due to a bow shock layer just above the mandrel (insufficient mass to propel through the bow shock). The narrower the particle size distribution, the more uniform the velocity is. This is because if one has large and small particles (bi-modal), the small ones will hit the slower, larger ones and effectively reduce the velocity of both.

The bonding mechanism employed by the process of the present invention for transforming the metal powder into a deposit is strictly solid state, meaning that the particles plastically deform. Any oxide layer that is formed on the particles is broken up and fresh metal-to-metal contact is made at very high pressures.

The powdered materials used to form the deposit may be fed using modified thermal spray feeders. Difficulty in feeding using standard feeders is due to the fine particle sizes and high pressures. One custom designed feeder that may be used is manufactured by Powder Feed Dynamics of Cleveland, Ohio. This feeder has an auger type feed mechanism. Fluidized bed feeders and barrel roll feeders with an angular slit may also be used.

In the process of the present invention, the feeders may be pressurized with nitrogen, helium, or any other inert gas. Feeder pressures are usually just above the main gas or head pressures, which head pressures usually range from 250 psi to 500 psi, depending on the powder alloy composition. The main gas is preferably heated so that gas temperatures are in the range of from 600 degrees Fahrenheit to 1200 degrees Fahrenheit. If desired, the main gas may be heated as high as approximately 1250 degrees Fahrenheit depending on the material being deposited onto the mandrel 10. The gas may be heated to keep it from rapidly cooling and freezing once it expands past the throat of the nozzle. The net effect is a mandrel temperature of about 115 degrees Fahrenheit during deposition (thus cold spray, not warm spray). Any suitable means known in the art may be used to heat the gas.

To form the deposit on the mandrel 10, a nozzle 20 of a spray gun 22 may pass over a surface 24 of the mandrel 10 to be coated more than once. The number of passes required is a function of the thickness to be applied. The process of the present invention is capable of forming a deposit 28 having any desired thickness. To form a thick layer, the spray gun 22 can be held stationary and be used to form a deposit layer on the mandrel 10 that is several inches high. When building a deposit layer, it is desirable to limit the thickness per pass in order to avoid a quick build up of residual stresses and unwanted debonding between deposit layers.

To apply a copper alloy deposit or coating 28 onto a surface of the mandrel 10 using a copper alloy containing from 2.0 to 10.0 wt % chromium and from 1.0 to 10.0 wt % niobium, such as GRCop-84 or GRCop-42 discussed hereinabove, one preferably provides the copper alloy in powder form with the powder particles having an average diameter size up to 50 microns. Most preferably, the copper alloy powder particles have an average diameter particle size in the range of from 5 microns to 25 microns.

The main gas that is used to deposit the particles onto the mandrel 10 may be passed through the nozzle 20 via inlet 30 and/or inlet 32 at a flow rate of from 0.001 SCFM to 50 SCFM, preferably in the range of 15 SCFM to 35 SCFM, if helium is used as the main gas. If nitrogen is used by itself or in combination with helium as the main gas, the nitrogen gas may be passed through the nozzle 20 at a flow rate of from 0.001 SCFM to 30 SCFM, preferably from 4.0 to 30 SCFM.

The main gas temperature may be in the range of from 600 degrees Fahrenheit to 1200 degrees Fahrenheit, preferably from 700 degrees Fahrenheit to 800 degrees Fahrenheit, and most preferably from 725 degrees Fahrenheit to 775 degrees Fahrenheit.

The pressure of the spray gun 22 may be in the range of from 200 psi to 500 psi, preferably from 250 psi to 500 psi. The powdered copper alloy material to be deposited is preferably fed from a hopper, which is under a pressure in the range of from 200 psi to 300 psi, preferably from 225 psi to 275 psi, to the spray gun 22 via line 34 at a rate in the range of from 10 grams/min to 100 grams/min, preferably from 15 grams/min to 50 grams/min. The powdered copper alloy material is preferably fed using a carrier gas, introduced via inlet 30 and/or 32, having a flow rate of from 0.001 SCFM to 50 SCFM, preferably from 8.0 SCFM to 15 SCFM, for helium, and from 0.001 SCFM to 30 SCFM, preferably from 4.0 SCFM to 10 SCFM, for nitrogen.

The spray nozzle 20 may be held at a distance away from the surface 24 of the mandrel 10 to be coated. This distance is known as the spray distance. Preferably the spray distance is in the range of from 10 mm to 50 mm. The velocity of the powdered copper alloy particles leaving the spray nozzle 20 may be in the range of from 800 m/s to 1400 m/s, preferably from 850 m/s to 1200 m/s. The deposit thickness per pass may be in the range of from 0.001 inches to 0.030 inches.

Figure 2:
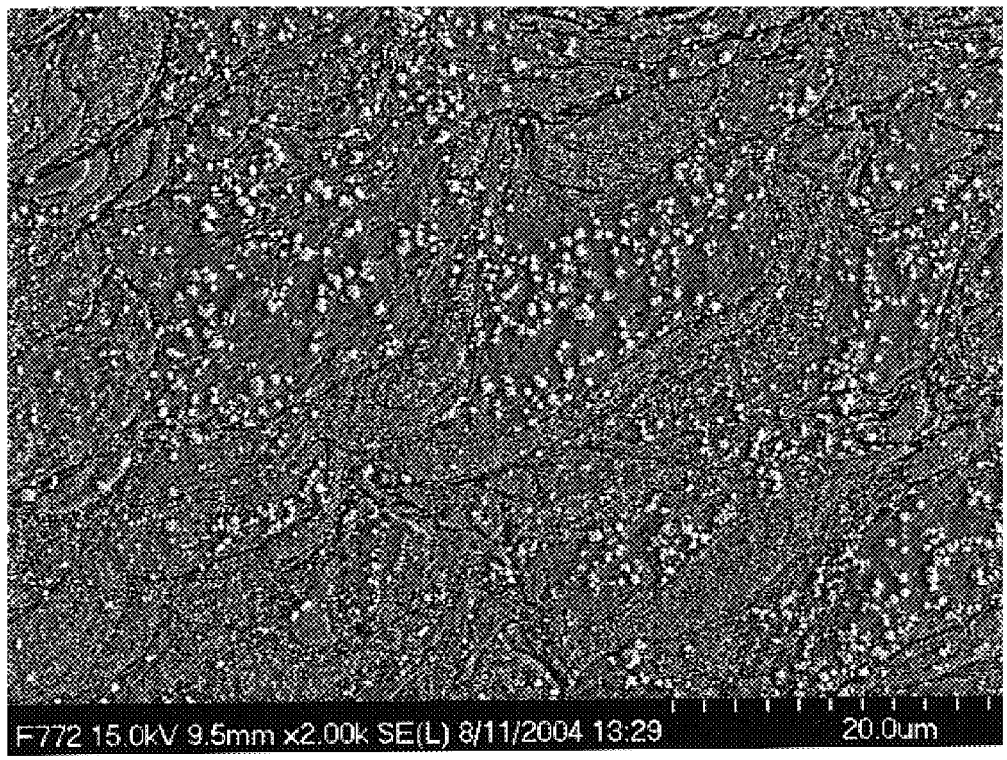
FIG. 2 is a photomicrograph of a copper alloy deposited onto a mandrel in accordance with the present invention.
Figure 3:
FIG. 3 is a photomicrograph of a copper alloy deposited onto a mandrel in accordance with the present invention.

When depositing a copper alloy material such as GRCop-84 and GRCop-42, the high kinetic energy of the process breaks up any agglomerated $Cr_2Nb$ particles. In GRCop-84, there is a pure copper matrix with the dispersoids of $Cr_2Nb$ particles comprising no more than about, and preferably about, 14 vol % of the alloy with the remainder being pure copper. As a result, the final deposited coating has a uniform distribution of $Cr_2Nb$ particles. When looking at a metallographic cross section, such as that shown in FIGS. 2 and 3, the fine $Cr_2Nb$ particles are located at the copper grain boundaries. Finer $Cr_2Nb$ particles are also found dispersed within the copper particles (within grains). The deposited copper alloy coatings have a thermal conductivity that is as high as or higher than a rolled sheet of the material being deposited.

The process of the present invention may be used to form a wide variety of articles. One article that may be formed is a combustion chamber liner. This may be fabricated by depositing a copper alloy material consisting of from 4.0 to 8.0 wt % chromium, from 2.0 to 4.0 wt % niobium, and the balance copper and inevitable impurities onto a mandrel formed from an aluminum containing material using the cold spray process described hereinabove.

After deposition of the copper alloy material has been completed, the material forming the mandrel, such as the aluminum containing material, may be chemically or mechanically removed using any suitable technique known in the art. For example, the aluminum containing material may be removed using any suitable leaching technique known in the art such as chemically removing the aluminum containing material with heated sodium hydroxide for a time period of about 1 hour. This leaves a free-standing monolithic combustion chamber liner of high strength and thermal conductivity.

After removal of the mandrel material, the combustion chamber liner may be turned if needed and may be subjected to any suitable heat treatment as needed.

If desired, the very fine spray pattern of the cold spray system, approximately 2.0 mm, can allow internal features 60, such as a bump, chevron, or flow trip, to be added to coolant passages 62 to further increase heat transfer by disrupting the flow, causing convection and more heat pick-up.

Figure 4A:
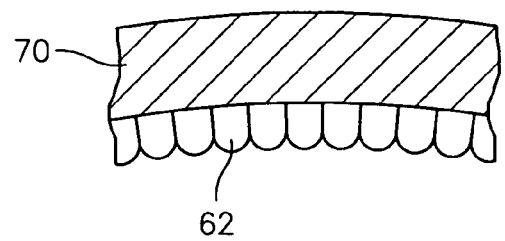
FIG. 4A shows a copper liner cross section which can be achieved using the cold spray process of the present invention.
Figure 4B:
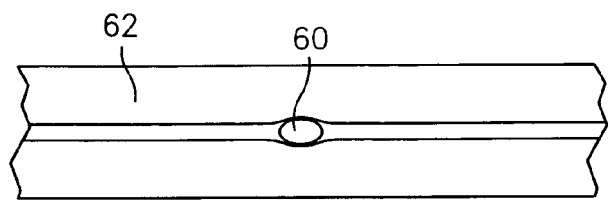
FIG. 4B illustrates a heat transfer improvement incorporated into the copper liner.

FIG. 4A shows a cross section of a copper liner 70 having a plurality of coolant passageways 62 which can be achieved using the cold spray process of the present invention. FIG. 4B shows an internal heat transfer feature 60 incorporated into a coolant passageway 62 of the copper liner.

Figure 5:
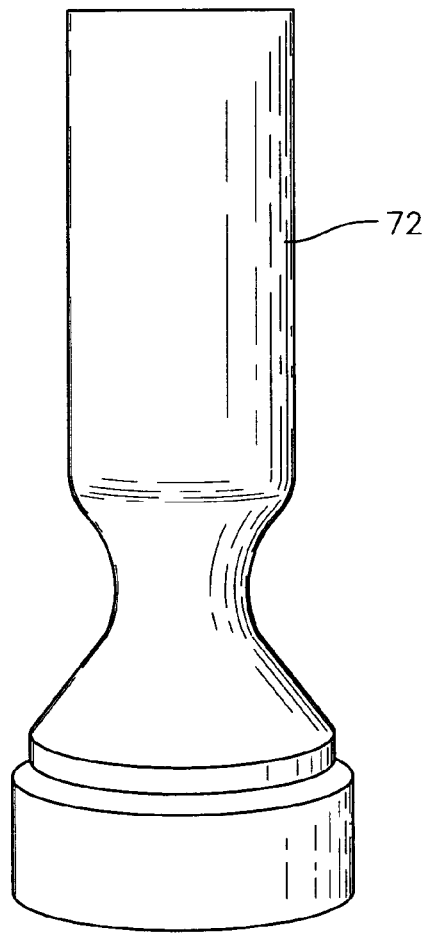
FIG. 5 illustrates a combustion chamber liner fabricated using the cold spray process of the present invention.

FIG. 5 illustrates a combustion chamber liner 72 which can be fabricated using the cold spray process of the present invention.

The cold spray process of the present invention is advantageous in that the powders are not heated to high temperatures. As a result, no oxidation, decomposition, or other degradation of the feedstock material occurs. Powder oxidation during deposition is also controlled since the particles are contained within the accelerating gas stream. Other potential advantages include the formation of compressive residual surface stresses and retaining the microstructure of the feedstock. Also, because relatively low temperatures are used, thermal distortion of the substrate will be minimized. Because the feedstock is not melted, cold spray offers the ability to deposit materials that cannot be sprayed conventionally (thermal spray) due to the formation of brittle intermetallics or a propensity to crack upon cooling following high heat deposition or during subsequent heat treatments. For example, an aluminum jacket could be direct cold sprayed onto a copper liner.

The cold spray process of the present invention creates high impact pressures that fracture the brittle oxide film surrounding each powder particle enabling fresh metal-metal contact. The fractured oxide film gets mostly consumed into the coating being deposited, while some is displaced from the deposited material by the supersonic jet and the bow shock that forms. As a result, there is at most the same oxygen content in the coating as in the starting powder. In some cases, there is lower oxygen content in the coating that is desirable to reduce the brittleness of the coating.

The cold spray process of the present invention is further advantageous in that it allows an article such as a copper tube 12-inch long by 1-inch diameter, by 0.300-inch thick to be formed in hours. Using powder metallurgy techniques, it typically takes months to form such an article. Thus, the process of the present invention offers much in the way of time and cost savings.

Still further, the cold spray process of the present invention is advantageous in that the deposits are 100% dense in as-sprayed condition. Thus, processes, such as HIP, are not required. The process can also replicate mandrel features for cooling circuit enhancements.

While the process of the present invention has been described as being a cold spray process, other deposition process may be used to form an article such as a combustion chamber liner. Such a deposition process must provide sufficient energy to accelerate particles to high enough velocity such that, upon impact, the particles plastically deform and bond to the surface and build a relatively dense coating or structural deposit. The deposition process should not metallurgically transform the particles from their solid state. Various techniques which may be used include, but are not limited to, kinetic metallization, electromagnetic particle acceleration, modified high velocity air fuel spraying, and high velocity impact fusion. In these processes, there is no metallurgical transformation of the powder metal particles.

It is apparent that there has been provided in accordance with the present invention a cold gas dynamic spraying of high strength copper which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications and variations as fall within the broad scope of the appended claims.

What is claimed is:

1. A process for forming a combustion chamber liner comprising the steps of:
providing a mandrel formed from an aluminum containing material having a net shape of a combustion chamber liner;
depositing a powdered metal material onto said mandrel without melting said powdered metal mandrel;
said depositing step comprising depositing at least one layer of a copper alloy containing chromium and niobium using a deposition technique which does not melt said copper alloy and which causes copper alloy particles to plastically deform and bond to a surface of the mandrel and thereby creating a deposited article having the shape of said combustion chamber liner on said mandrel and having a uniform distribution of $Cr_2Nb$ particles in a copper matrix with fine $Cr_2Nb$ particles being located at copper grain boundaries; and
removing said material forming said mandrel to leave a free standing monolithic combustion chamber liner formed from said copper alloy.

2. A process according to claim 1, wherein said particles are accelerated to a speed in the range of from 800 m/s to 1400 m/s.

3. A process according to claim 1, wherein said particles are accelerated to a speed in the range of from 850 m/s to 1200 m/s.

4. A process according to claim 1, wherein said removing step comprises removing said material chemically using heated sodium hydroxide.

5. A process according to claim 1, wherein said depositing step comprises depositing a copper alloy containing from 1.0 to 10.0 wt % niobium and from 2.0 to 10.0 wt % chromium.

6. A process according to claim 1, wherein said depositing step comprises depositing a copper alloy containing 8.0 wt % chromium and 4.0 wt % niobium.

7. A process according to claim 1, wherein said depositing step comprises depositing a copper alloy containing 4.0 wt % chromium and 2.0 wt % niobium.

8. A process according to claim 1, wherein said depositing step comprises providing particles of said powdered metal material having a size in the range of from a size sufficient to avoid getting swept away from the mandrel due to a bow shock layer to up to 50 microns and forming a deposit layer on at least one surface of said mandrel by passing said metal powder particles through a spray nozzle at a speed sufficient to plastically deform the metal powder particles on said at least one surface.

9. A process according to claim 8, wherein said metal powder particles providing step comprises providing metal powder particles having a particle size in the range of from 5 microns to 25 microns.

10. A process according to claim 8, wherein said powder providing step comprises feeding said metal powder particles to said nozzle at a feed rate of from 10 grams/min. to 100 grams/min. and at a pressure in the range of from 200 psi to 300 psi using a carrier gas selected from the group consisting of helium, nitrogen, and mixtures thereof.

11. A process according to claim 10, wherein said feeding step comprises feeding said metal powder particles to said nozzle at a rate of from 15.0 grams/min to 50 grams/min.

12. A process according to claim 10, wherein said carrier gas comprises helium and said feeding step comprises feeding said helium to said nozzle at a flow rate of from 0.001 SCFM to 50 SCFM.

13. A process according to claim 10, wherein said carrier gas comprises helium and said feeding step comprises feeding said helium to said nozzle at a flow rate of from 8.0 SCFM to 15 SCFM.

14. A process according to claim 10, wherein said carrier gas comprises nitrogen and said feeding step comprises feeding said nitrogen to said nozzle at a flow rate of from 0.001 SCFM to 30 SCFM.

15. A process according to claim 10, wherein said carrier gas comprises nitrogen and said feeding step comprises feeding said nitrogen to said nozzle at a flow rate of from 4.0 SCFM to 10 SCFM.

16. A process according to claim 8, wherein said forming step further comprises passing said metal powder particles through said nozzle using a main gas selected from the group consisting of helium, nitrogen, and mixtures thereof at a main gas temperature in the range of from 600° F. to 1200° F. and at a spray pressure in the range of 200 psi to 500 psi.

17. A process according to claim 16, wherein said passing step comprises passing said metal powder particles through said nozzle at a main gas temperature in the range of 700° F. to 800° F. a spray pressure in the range of from 250 psi to 500 psi.

18. A process according to claim 16, wherein said main gas temperature in the range of from 725° F. to 775° F.

19. A process according to claim 16, wherein said main gas comprises helium and wherein said passing step comprises feeding said helium to said nozzle at a rate in the range of from 0.001 SCFM to 50 SCFM.

20. A process according to claim 16, wherein said main gas comprises helium and wherein said passing step comprises feeding said helium to said nozzle at a rate in the range of from 15 SCFM to 35 SCFM.

21. A process according to claim 16, wherein said main gas comprises nitrogen and wherein said passing step comprises feeding said nitrogen to said nozzle at a rate in the range of from 0.001 SCFM to 30 SCFM.

22. A process according to claim 16, wherein said main gas comprises nitrogen and wherein said passing step comprises feeding said nitrogen to said nozzle at a rate in the range of from 4.0 SCFM to 30 SCFM.

23. A process according to claim 8, further comprising maintaining said nozzle at a distance from 10 mm to 50 mm from said at least one surface being coated.

24. A process according to claim 1, wherein said depositing step comprises depositing said copper alloy using a cold spray deposition technique and so that no more than about 14 vol % of the alloy is formed by dispersoids of said $Cr_2Nb$ particles and the remainder being pure copper.

25. A process according to claim 1, further comprising directly cold spraying an aluminum jacket on said combustion chamber line.

* * * * *